(12) United States Patent
Agersbæk et al.

(10) Patent No.: US 10,611,545 B2
(45) Date of Patent: Apr. 7, 2020

(54) CONTAINER SHOCK DETECTION SYSTEM

(71) Applicant: Emerson Climate Technologies-Transportation Solutions ApS

(72) Inventors: Jens Henrik Agersbæk, Horsens (DK); Shekib Habbassy, Viby J (DK); Lissa Rose D'Arcy, Ebeltoft (DK); Richard Ulfarsson, Skjern (DK); Flemming Steffensen, Tilst (DK)

(73) Assignee: Emerson Climate Technologie—Transportation Solutions ApS, Hojbjerg (DK)

( * ) Notice: Subject to any disclaimer, the term of this patent is extended or adjusted under 35 U.S.C. 154(b) by 249 days.

(21) Appl. No.: 15/706,000

(22) Filed: Sep. 15, 2017

(65) Prior Publication Data

US 2018/0079578 A1    Mar. 22, 2018

Related U.S. Application Data

(60) Provisional application No. 62/396,625, filed on Sep. 19, 2016.

(51) Int. Cl.
*B65D 79/02*    (2006.01)
*B65D 90/48*    (2006.01)
(Continued)

(52) U.S. Cl.
CPC ............. *B65D 79/02* (2013.01); *B65D 90/48* (2013.01); *G01L 5/0052* (2013.01); *G01P 1/127* (2013.01);
(Continued)

(58) Field of Classification Search
CPC ...................................................... B65D 79/02
See application file for complete search history.

(56) References Cited

U.S. PATENT DOCUMENTS 5,659,302 A      8/1997   Cordier
2010/0217558 A1  8/2010   Tan et al.
(Continued)

FOREIGN PATENT DOCUMENTS

DE         19832341 A1    1/2000
WO      WO-2016093873 A1    6/2016

OTHER PUBLICATIONS

Savignano. Translation of DE19832341. Published Jan. 2000. Translated Jul. 2019. (Year: 2000).*

(Continued)

*Primary Examiner* — Walter L Lindsay, Jr.
*Assistant Examiner* — Philipmarcus T Fadul
(74) *Attorney, Agent, or Firm* — Harness, Dickey & Pierce, P.L.C.

(57) ABSTRACT

Systems and methods are provided and include a modem control unit that is configured to receive a force signal from a force sensor representing an amount of impact force applied to a container. The modem is configured to determine based on the force signal, a bias value, a shock intensity of the force signal, and a shock severity of the force signal in response to a determination that the shock intensity is greater than a shock intensity threshold. The modem control unit is configured to determine an average shock severity based on a plurality of shock severity values and an absolute value indicator based on the bias value and the shock severity value, an average absolute value indicator based on the average shock severity and the bias value, and a presence of excessive mechanical shock based on the average absolute value indicator and based on the absolute value indicator.

19 Claims, 5 Drawing Sheets

(51) Int. Cl.
   *G01P 1/12*   (2006.01)
   *G01P 15/08*  (2006.01)
   *G01L 5/00*   (2006.01)
   *G01P 15/18*   (2013.01)

(52) U.S. Cl.
   CPC .. *G01P 15/0891* (2013.01); *B65D 2590/0083* (2013.01); *G01P 15/18* (2013.01)

(56) References Cited

U.S. PATENT DOCUMENTS

| | | | |
|---|---|---|---|
| 2011/0277532 A1* | 11/2011 | Bartholomeyczik | ... G01P 15/18 73/1.38 |
| 2013/0081442 A1 | 4/2013 | Basir et al. | |
| 2014/0139338 A1* | 5/2014 | Mostov | ............ G08B 13/22 340/568.1 |

OTHER PUBLICATIONS

International Preliminary Report on Patentability regarding International Application No. PCT/IB2017/055682 dated Mar. 19, 2019.
International Search Report regarding International Application No. PCT/IB2017/055682, dated Dec. 8, 2017.
Written Opinion of the International Searching Authority regarding International Application No. PCT/IB2017/055682, dated Dec. 8, 2017.

* cited by examiner

CONTAINER SHOCK DETECTION SYSTEM

CROSS-REFERENCE TO RELATED APPLICATIONS

This application claims the benefit of U.S. Provisional Application No. 62/396,625, filed on Sep. 19, 2016. The entire disclosures of the above application is incorporated herein by reference.

FIELD

The present disclosure relates to a shock detection system for a container, such as a refrigerated container or reefer.

BACKGROUND

This section provides background information related to the present disclosure which is not necessarily prior art.

Intermodal freight transport, which is the transportation of freight in an intermodal container using multiple modes of transportation and without any handling of the freight itself when changing modes, is complex, as it involves the movement of goods around the world. During intermodal transport, the freight may experience harmonic vibrations and/or external forces that can cause a load within the intermodal container to move vertically, longitudinally, and laterally. As a result, freight in an intermodal container may be damaged in response to a harmonic vibration and/or external force. Thus, there is a need for system and a method for detecting excessive force and/or vibrations during intermodal freight transport.

SUMMARY

This section provides a general summary of the disclosure, and is not a comprehensive disclosure of its full scope or all of its features.

A method for detecting mechanical shock of a container is provided. The method includes receiving, using a processor of the modem, a force signal from a force sensor representing an amount of impact force applied to the container. The method also includes determining, based on instructions stored in a non-transitory memory component and executable by the processor and based on the force signal, a bias value. The method also includes determining, based on instructions stored on the non-transitory memory component and executable by the processor and based on the force signal, a shock intensity of the force signal. The method also includes determining, based on instructions stored on the non-transitory memory component and executable by the processor, a shock severity of the force signal in response to a determination that the shock intensity is greater than a shock intensity threshold. The method also includes determining, based on instructions stored on the non-transitory memory component and executable by the processor, an average shock severity based on a plurality of shock severity values. The method also includes determining, based on instructions stored on the non-transitory memory component and executable by the processor, an absolute value indicator based on the bias value and the shock severity value. The method also includes determining, based on instructions stored on the non-transitory memory component and executable by the processor, an average absolute value indicator based on the average shock severity and the bias value. The method also includes determining, based on instructions stored on the non-transitory memory component and executable by the processor, a presence of excessive mechanical shock based on the average absolute value indicator and based on the absolute value indicator.

A system is also provided and includes a modem control unit that is configured to receive, using a processor of the modem control unit, a force signal from a force sensor representing an amount of impact force applied to a container. The modem control unit is also configured to determine, based on instructions stored in a non-transitory memory component and executable by the processor and based on the force signal, a bias value. The modem control unit is also configured to determine, based on instructions stored on the non-transitory memory component and executable by the processor and based on the force signal, a shock intensity of the force signal. The modem control unit is also configured to determine, based on instructions stored on the non-transitory memory component and executable by the processor, a shock severity of the force signal in response to a determination that the shock intensity is greater than a shock intensity threshold. The modem control unit is also configured to determine, based on instructions stored on the non-transitory memory component and executable by the processor, an average shock severity based on a plurality of shock severity values. The modem control unit is also configured to determine, based on instructions stored on the non-transitory memory component and executable by the processor, an absolute value indicator based on the bias value and the shock severity value. The modem control unit is also configured to determine, based on instructions stored on the non-transitory memory component and executable by the processor, an average absolute value indicator based on the average shock severity and the bias value. The modem control unit is also configured to determine, based on instructions stored on the non-transitory memory component and executable by the processor, a presence of excessive mechanical shock based on the average absolute value indicator and based on the absolute value indicator.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
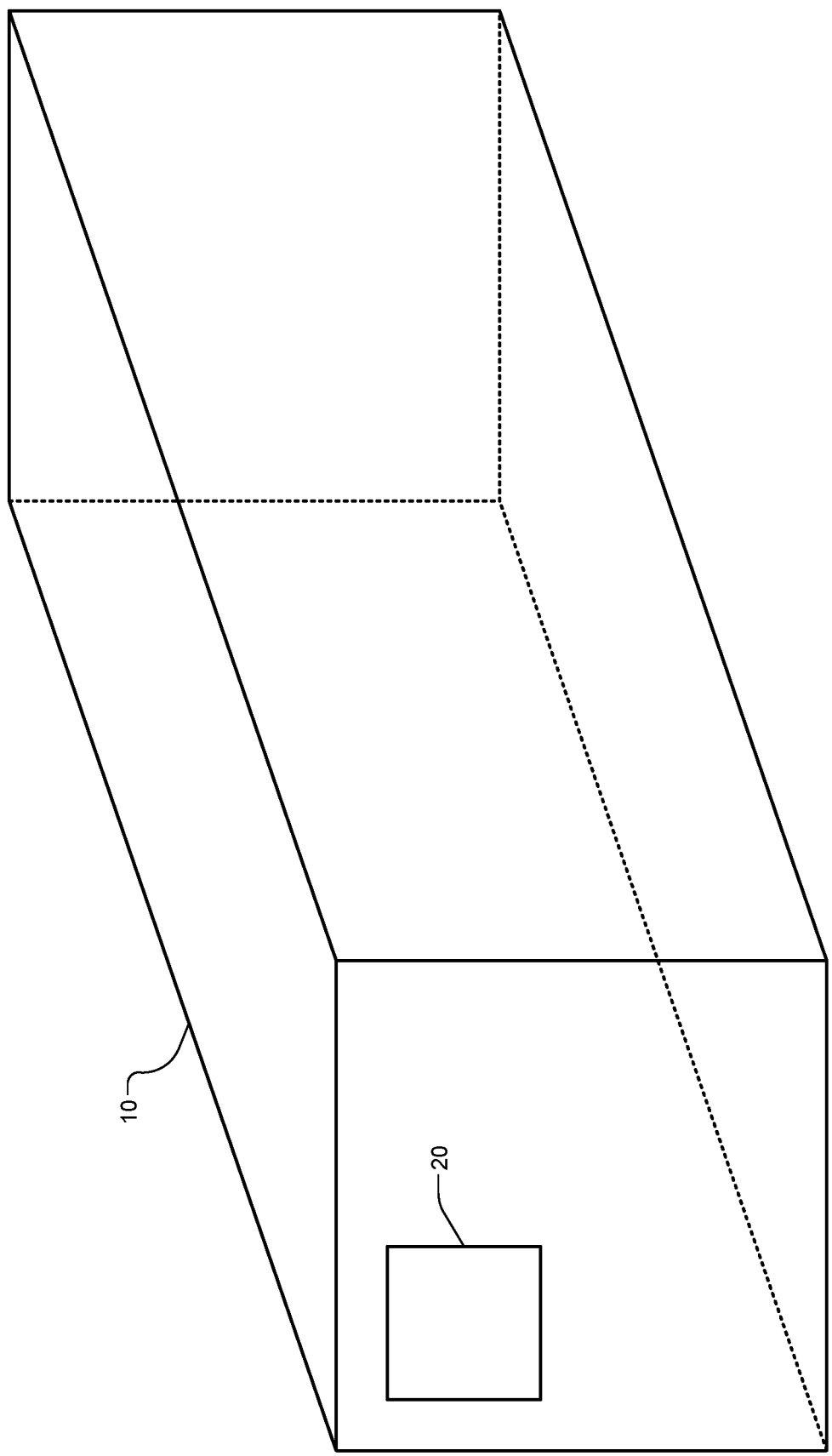
FIG. 1 is a container with a modem.

With reference to FIG. 1, a container 10 with a modem 20 is shown. In one embodiment, the container 10 is a refrigerated container or a reefer, which is an intermodal container used in intermodal freight transport that is refrigerated for the transportation of temperature sensitive cargo. Alternatively, the container 10 may be other types of containers used for intermodal freight transport. The container 10 may further include a refrigeration unit that may be powered by diesel powered generators during intermodal transport. The DC refrigeration unit of the container 10 may be configured to set the temperature of the container 10 at a variety of temperatures between, for example, −65° C. and 40° C.

The modem 20, which may be a remote monitoring modem (RMM), may be configured to provide real-time remote monitoring and tracking information of the container 10 to a remote server or a cloud. Additionally, the modem 20 may be configured to provide, via the remote server or the cloud, centralized remote management of the container's operating conditions, alarms, events, settings, and positions. The modem 20 provides a variety of benefits for intermodal freight transport, including, for example, full transparency in a cooling chain; improved utilization of the container 10; reduced risk of potential cargo damage; reduction of operational costs due to less time-consuming manual inspections; reduction of unexpected events, such as container tampering, theft, diversion, or holdups during intermodal freight transport; improved safety of personnel; improved cargo documentation handling processes; optimization of the container operation with a reduced risk of human errors; and energy savings as a result of constant modem software updates that include the latest energy efficient programs. The modem 20 is described below in further detail with reference to FIG. 2 and FIG. 3.

Figure 2:
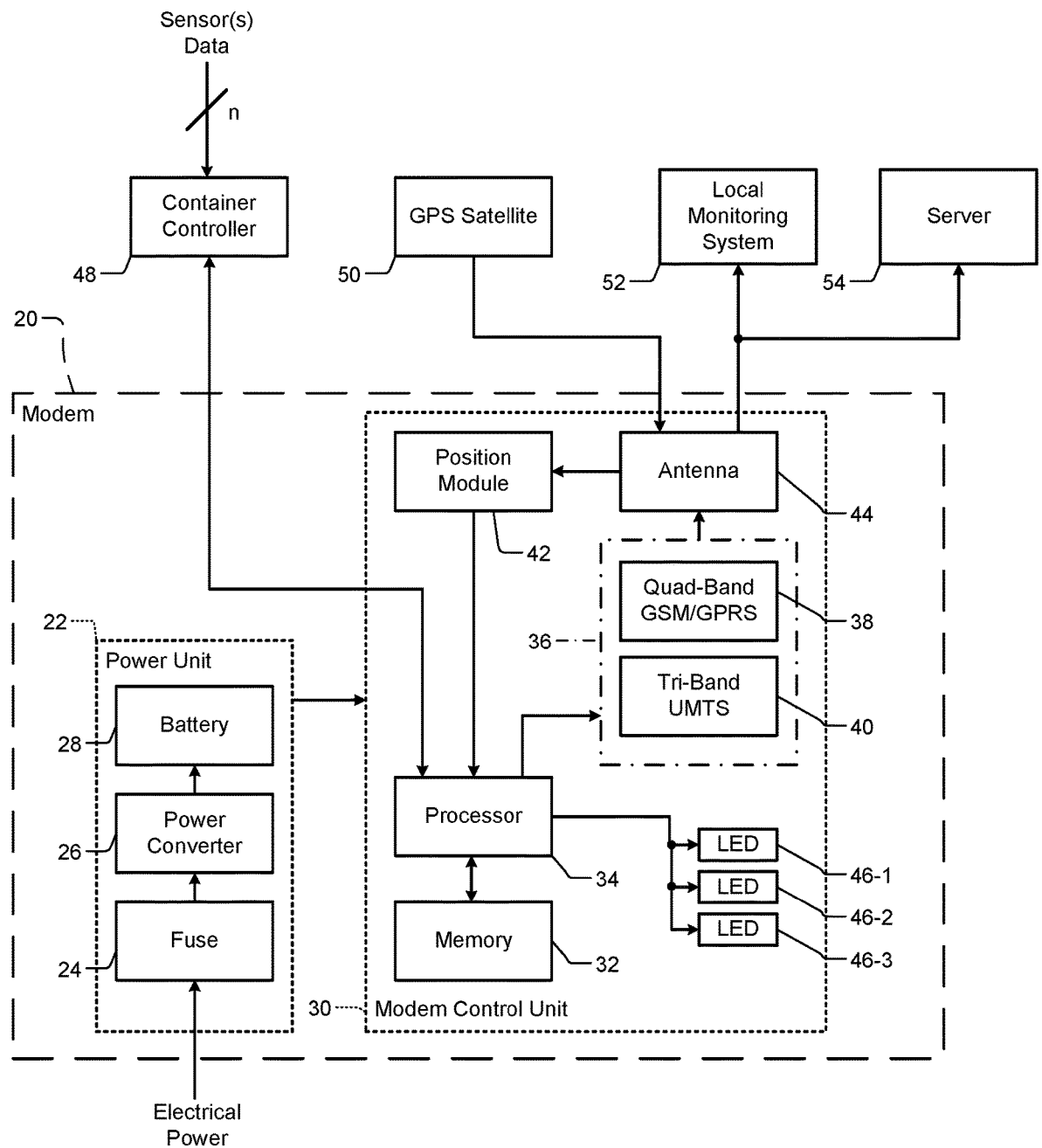
FIG. 2 is a detailed illustration of the modem.

With reference to FIG. 2, a detailed illustration of the modem 20 is shown. In an example embodiment, the modem 20 may include a power unit 22, which may further include a fuse 24, a power converter 26, and a battery 28. Additionally, the modem 20 may include an modem control unit 30, which further includes a memory module 32, a processor 34, and a communication module 36 that includes a quad-band global system for mobile communication (quad-band GSM) module 38 and a tri-band universal mobile telecommunications system communication (tri-band UMTS) module 40. The modem control unit 30 may also include a position module 42, an antenna 44, and LEDs 46-1, 46-2, and 46-3 (collectively referred to as LEDs 46).

The modem power unit 22 is configured to provide power to the modem 20. In one embodiment, the modem power unit 22 receives electrical power from an AC voltage source, converts the electrical power from the AC voltage source to an electrical power within a product supply rating, and then provides the converted electrical power to the modem 20. Alternatively, the modem power unit 22 may be configured to receive electrical power from a DC voltage source.

In one embodiment, the power converter 26 receives electrical power from the AC voltage source through the fuse 24, which is configured to prevent excessive currents from being applied to the modem 20. In one embodiment, the fuse 24 may be selected such that a maximum current rating in which the fuse can safely break at a rated voltage does not exceed a threshold current, which may be, for example, 32 Amperes (A).

The power converter 26 may be configured to convert an AC signal from the AC power supply to a new AC signal that is provided to the modem control unit 30. In one embodiment, a transformer may be implemented to reduce the voltage from the AC power supply (e.g., $240V_{AC}$) to an input voltage that is less than or equal to a product supply rating voltage of the modem 20 (e.g., $24V_{AC}$). Additionally, the transformer may be configured to limit an amount of current from the AC power supply to a product supply current rating, which may be, for example, 1.5 A. Alternatively, the power converter 26 may be an indirect AC-AC converter that includes a rectifier, a DC link, and an inverter.

Alternatively, the power converter 26 may be configured to convert the AC signal from the AC power supply to a DC signal that is provided to the modem control unit 30. As an example, the power converter 26 may include the transformer to reduce the voltage from the AC power supply (e.g., $240V_{AC}$) to the input voltage within the product supply rating voltage of the modem 20 (e.g., $24V_{AC}$). Subsequently, a rectifier, which may be electrically coupled to the transformer, may be configured to convert the input voltage to into a DC signal (e.g., 24V). The rectifier may include four switching components, such as a diode, bipolar junction transistor (BJT), or metal-oxide-semiconductor field-effect transistor (MOSFET) arranged in a bridge configuration.

The battery 28, in response to receiving electrical power from the AC power supply through the fuse 24 and the power converter 26, may be configured to provide the input voltage to the modem control unit 30. Additionally, the battery 28 may provide power to other components that are not located in the modem control unit 30, which may include, for example, a plurality of sensors of the container 10.

The modem control unit 30 may be configured to provide, via the remote server or the cloud, real-time remote monitoring and tracking information of the container 10 and centralized remote management of the container's operating conditions, alarms, events, settings, and positions. The processor 34 may be configured to, based on instructions that are executable by the processor 34 and stored in the memory module 32, carry out the functionality described herein. The memory module 32 may be a non-transitory computer readable medium, such as a nonvolatile memory circuit, volatile memory circuit, magnetic storage media, and optical storage media.

In one embodiment, the processor 34 receives geospatial location data of the container 10 from a GPS satellite 50 via the antenna 44 and the position module 42. In response to the position module 42, which may include a GPS receiver, receiving geospatial data from the GPS satellite 50, the processor 34 may be configured to determine a GPS location of the container 10 and store the GPS location in the memory module 32.

In one embodiment, the processor 34 receives sensor data from a container controller 48 representing a variety of operating characteristics of the container 10, including electric power consumption, suction, discharge temperature, pressure of a compressor and condenser, evaporator temperature data, etc. Additionally, the processor 34 may be configured to provide a signal to the container controller 48 that is operable to adjust the settings of the refrigeration system of the container 10 in response to a determination of that the one of the settings need to be modified.

The container controller 48 and the processor 34 may communicate via a hardwired link and/or telemetric link. In one embodiment, the container controller 48 and the processor 34 may communicate via an ISO 10368 Power Line interface, which is the interface required to permit complying central monitoring and control systems employed by one carrier or terminal to interface and communicate with complying remote communication devices of differing manufacture and configuration used by other carriers and terminals. Thus, the processor 34 may be configured to receive operating conditions and alarms from a plurality of different container controllers 48, including, for example, CARRIER controllers, DAIKIN controllers, STARCOOL controllers, and THERMO KING controllers. Alternatively, the container controller 48 and the processor 34 may communicate via other industry standard interfaces that are set forth by, for example, the International Organization for Standardization.

In one embodiment, the processor 34 may be configured to instruct the communication module 36 to provide operational and location data of the container 10 to a local monitoring system 52 and/or a server 54, which may be a global monitoring server. As an example, the processor 34 may instruct the at least one of the quad-band GSM module 38 and the tri-band UMTS module 40 to transmit operational and location data of the container 10 to a local monitoring system 52. If a local monitoring system 52 is not present, the processor 34 may instruct the at least one of the quad-band GSM module 38 and the tri-band UMTS module 40 to transmit operational and location data of the container 10 to the server 54. The local monitoring system 52 and the server 54 may be configured to collect and store operational and location data transmitted by the modem 20. The local monitoring system 52 and the server 54 may also allow a user to remotely manage the container's operating conditions, alarms, events, settings, and positions. As an example, the local monitoring system 52 may be an EMERSON REFCON control system.

In one embodiment, the processor 34 may be configured to activate and deactivate the LEDs 46 in response to an operating condition of the container 10 and/or the modem 20. As an example, when the processor 34, via the position module 42, is unable to determine the GPS location of the container 10, LED 46-1 may be deactivated and will not emit light. Further, when the processor 34, via the position module 42, is able to determine the GPS location of the container 10, LED 46-1 may be activated and emit light. As another example, if the processor 34, via the position module 42, makes an incorrect determination of the GPS location of the container 10, then LED 46-1 may emit a flashing light to represent the incorrect determination. The LEDs 46 may also be activated and deactivated to represent other conditions of the modem 20 and/or the container 10, such as, for example, a status of the communication module 36 and the operating characteristics of the container 10.

Figure 3:
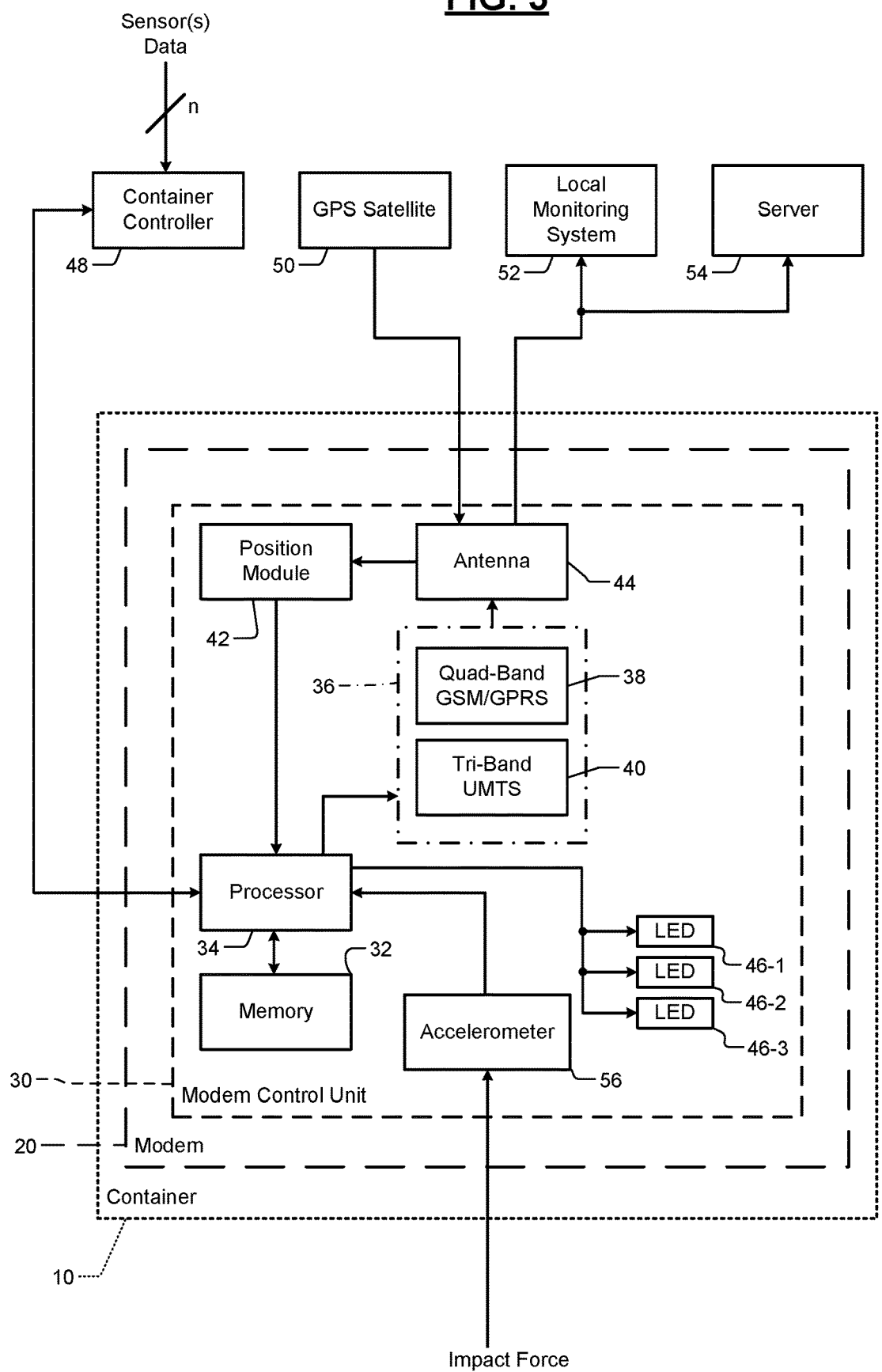
FIG. 3 is a detailed illustration of the modem with an accelerometer.

With reference to FIG. 3, a detailed illustration of the modem control unit 30 with an accelerometer 56 is shown. An impact force applied to the container 10, as shown by the signal labeled "Impact Force," may cause each of the components to experience a transient physical excitation (i.e., mechanical shock). Thus, to determine the amount of mechanical shock of each of these components in response to the impact force, the accelerometer 56 may be included in the modem control unit 30.

Accordingly, the accelerometer 56 is configured to detect an amount of force applied to the container 10. Specifically, the accelerometer 56 may be configured to detect an amount of mechanical shock of the container 10 from an external force and/or impact on the container 10. In response to detecting a mechanical shock, the processor 34 may be configured to determine the amount of mechanical shock of the container 10. Based on the amount of mechanical shock, the modem 20 may communicate, using the communication module 36, an existence of excessive mechanical shock to the local monitoring system 52 and/or the server 54. The method of determining and communicating the presence of excessive mechanical shock is described in further detail in FIG. 4A and FIG. 4B.

An impact force applied to the container 10 may propagate through the container 10, modem 20, modem control unit 30, and the accelerometer 56. Depending on the resonant frequency of each of the container 10, modem 20, modem control unit 30, and the accelerometer 56, the impact force applied to the container 10 may not be accurately detected and measured by the accelerometer 56. As such, the transfer functions (e.g., the amount of mechanical shock detected at the output compared to the actual amount of mechanical shock applied) may need to be determined individually for each of the container 10, modem 20, modem control unit 30, and the accelerometer 56 in order to accurately determine the impact force applied to the container 10. Thus, the processor 34 may be configured to, based on the transfer functions of each of the components, calculate the mechanical shock of the container 10 in response to an impact force.

While the accelerometer 56 is shown as a component of the modem control unit 30, in alternate embodiments, the accelerometer 56 may not be included in the modem control unit 30. Rather, the accelerometer 56 may be directly coupled to the container 10. Accordingly, the accelerometer 56 may communicate force data to the modem control unit 30 via a hardwire and/or telemetric link.

Figure 4A:
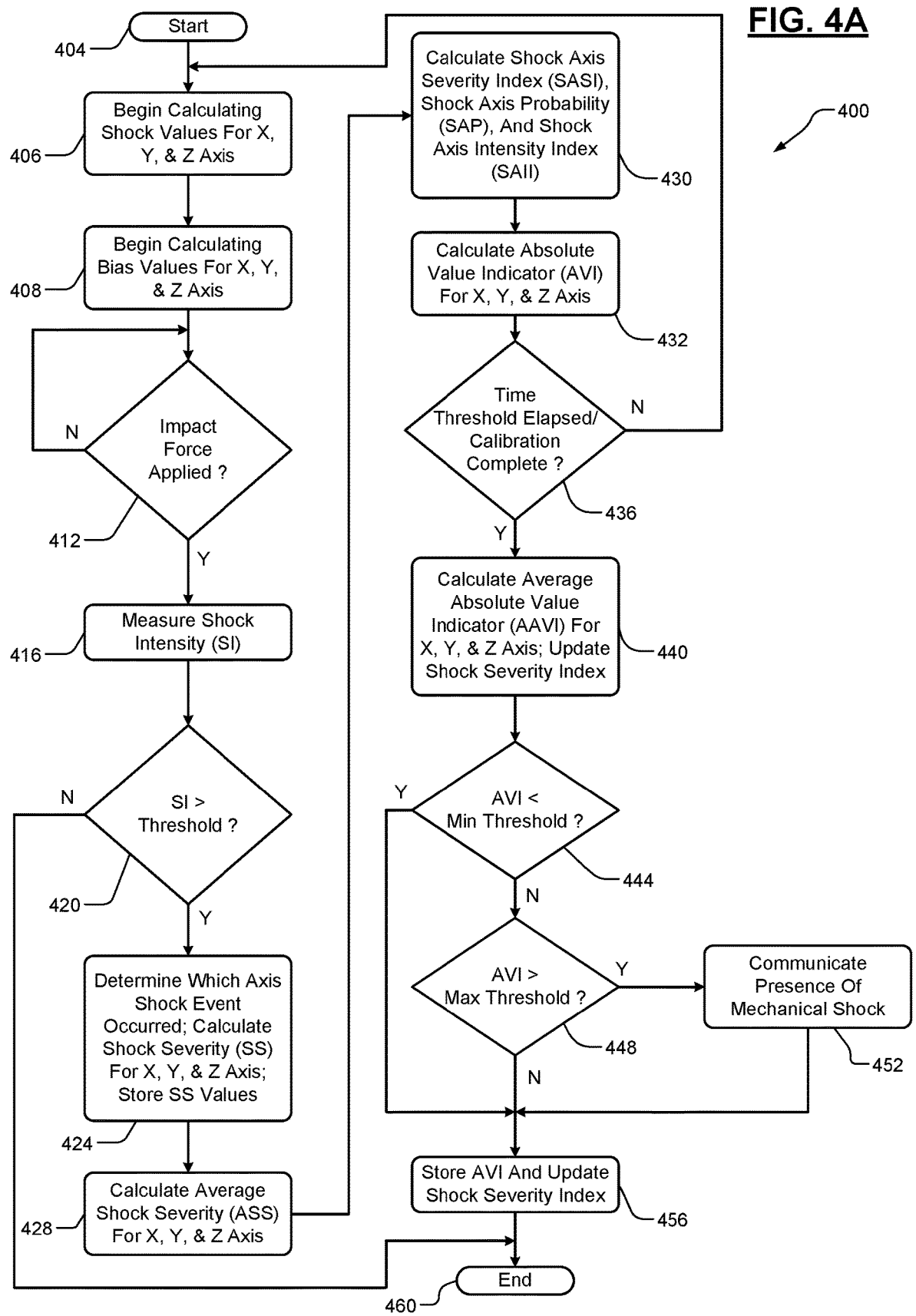
FIG. 4A is a flowchart illustrating a method of determining and communicating excessive mechanical shock of a container.

With reference to FIG. 4A, a flowchart 400 illustrating a method of determining and communicating excessive mechanical shock of a container 10 is shown. The algorithm begins at 404 when, for example, the modem 20 is turned on. At 406, the algorithm begins calculating shock values for an X-axis, Y-axis, and Z-axis of the container 10. In one embodiment, shock value of each axis (hereinafter represented by variables x, y, and z) may be sampled by the modem 20 at a rate of 400 samples per second.

At 408, the modem 20 begins to calculate bias values for the X-axis, Y-axis, and Z-axis of the container 10. The bias values of the X-axis, Y-axis, and Z-axis (hereinafter represented by variables Bx, By, and Bz) are the average shock values determined over an extended period of time. As such, the bias value of each axis is a dynamic value that may be constantly updated over time. In one embodiment, a bias value of approximately 1G may reveal an axis of gravity of the container 10. At 412, the algorithm determines whether any impact force is applied to the container 10. If the modem 20 detects an impact force and a resulting mechanical shock, the algorithm transfers to 416; otherwise, the algorithm remains at 412 until a mechanical shock is detected by the modem 20.

At 416, in response to detecting an impact force, the modem 20 measures a shock intensity of the mechanical shock. The shock intensity of the X-axis, Y-axis, and Z-axis (hereinafter represented by the variables SIx, SIy, and SIz) are defined as the amount of energy measured in a 10 sample period, and it is calculated as the average of the values registered. As an example, if a mechanical shock is detected by the modem 20, and the pulse of the shock has a pulse-duration of 1 second, then 40 shock intensities will be determined by the modem 20. To determine the shock intensity of each axis based on a sampled value, wherein the variable n represents the sample number of a sample period, the following formulas below may be used:

$$SIx = AVG((x_n - Bx), (x_{n+1} - Bx), \ldots (x_{n+9} - Bx))$$

$$SIy = AVG((y_n - By), (y_{n+1} - By), \ldots (y_{n+9} - By))$$

$$SIz = AVG((z_n - Bz), (z_{n+1} - Bz), \ldots (z_{n+9} - Bz))$$

At 420, the algorithm determines whether the shock intensity of one of the X-axis, Y-axis, and Z-axis exceeds a shock intensity threshold. If so, the algorithm transfers to 420; otherwise, the shock intensity value is discarded by the modem 20 and the algorithm ends at 460. The shock intensity threshold is defined as a minimum value that must be satisfied in order for the modem 20 to recognize that the container 10 was subjected to a potentially damaging mechanical shock. The shock intensity threshold may be chosen based on, for example, the container type and geometry. In one embodiment, the shock intensity threshold may be 1.5G; thus, the shock intensity must exceed 1.5G in order for the modem 20 to recognize that the container 10 was subjected to a potentially damaging mechanical shock.

At 424, the algorithm determines that a shock event has occurred and determines the axis where the shock event occurred. Subsequently, the algorithm calculates and stores a shock severity of the mechanical shock. The shock severity of the X-axis, Y-axis, and Z-axis (hereinafter represented by the variables SSx, SSy, and SSz) are defined as a measure of the energy in a 400 sample period, and it is calculated as the average of the absolute values registered. To determine the shock severity of each axis based of a sample period (e.g., $x_1$ represents the first X-axis shock value of a 400 sample period, and $x_{400}$ represents the last X-axis shock value of a 400 sample period), the following formulas below may be used:

$$SSx=AVG(ABS(x_1-Bx),ABS(x_2-Bx), \ldots ABS(x_{400}-Bx))$$

$$SSy=AVG(ABS(y_1-By),ABS(y_2-By), \ldots ABS(y_{400}-By))$$

$$SSz=AVG(ABS(z_1-Bz),ABS(z_2-Bz), \ldots ABS(z_{400}-Bz))$$

The sample period for which the shock severity is calculated may be chosen based on the sample period in which the shock intensity occurred. As an example, if an impact force has a pulse-duration of 2 seconds, and the sampling period is 400 samples per second, then 800 samples of shock values and 80 shock intensities may be calculated. If the shock intensity first registered above the shock intensity threshold at the $34^{th}$ measured shock intensity (i.e., the $330^{th}$-$340^{th}$ samples), then the shock severity of the pulse from 0 seconds-1 second (i.e., the $1^{st}$-$400^{th}$ samples) are calculated. Alternatively, the shock severity of the pulse may be calculated from the first registered shock intensity that is above the shock intensity threshold (i.e., the $330^{th}$-$730^{th}$ samples).

At 428, the algorithm determines and stores an average shock severity of the mechanical shock. The average shock severity of the X-axis, Y-axis, and the Z-axis (hereinafter represented by the variables ASSx, ASSy, and ASSz) are defined as an average shock severity value of a predetermined number of previous shock severity samples. As an example, the predetermined number of shock severity samples may be 200 samples. To determine the average shock severity of each axis, wherein $x_1$, $y_1$, and $z_1$ represent the measured shock severity for each axis of the most recent sample, and $x_2$, $y_2$, and $z_2$ represent the measured shock severity for each axis of the following most recent sample, the following formulas below may be used:

$$ASSx=AVG(SSx_1,SSx_2, \ldots SSx_{200})$$

$$ASSy=AVG(SSy_1,SSy_2, \ldots SSy_{200})$$

$$ASSz=AVG(SSz_1,SSz_2, \ldots SSz_{200})$$

At 430, the algorithm calculates a shock axis severity index for each axis (SASIx, SASIy, and SASIz), a shock axis probability of each axis (SAPx, SAPy, and SAPz), and a shock axis intensity index (SAIIx, SAIIy, and SAIIz). The shock axis severity index is a measure of the energy of each axis during a shock event. The following formulas below may be used to calculate the shock axis severity index for each axis:

$$SASIx=SSx/ASSx$$

$$SASIy=SSy/ASSy$$

$$SASIz=SSz/ASSz$$

The shock axis probability is an assessment of a probability of which axis was subjected to the mechanical shock that was above the shock intensity threshold. In one embodiment, a shock axis probability above 0.7 indicates that the respective axis was likely subjected to the mechanical shock, while a shock axis probability below 0.4 indicates that the respective axis was not likely subjected to the mechanical shock. The following formulas below may be used to calculate the shock axis severity index for each axis:

$$SAPx=SASIx/\sqrt{SASIx^2+SASIy^2+SASIz^2}$$

$$SAPy=SASIy/\sqrt{SASIx^2+SASIy^2+SASIz^2}$$

$$SAPz=SASIz/\sqrt{SASIx^2+SASIy^2+SASIz^2}$$

The shock axis intensity index is a measure of the impact of each axis at the beginning of a shock event. The following formulas below may be used to calculate the shock axis index $$SAIIx=SIx/ASSx$$

$$SAIIy=SIy/ASSy$$

$$SAIIz=SIz/ASSz$$

At 432, the algorithm calculates an absolute value indicator of the mechanical shock. The absolute value indicator (hereinafter referred to as AVI) may be defined as a normalized measure of energy of the mechanical shock. To determine the absolute value indicator, the following formulas below may be used:

$$AVI=SSx+ABS(Bx)+SSy+ABS(By)+SSz+ABS(Bz)$$

At 436, the algorithm determines whether the time threshold has elapsed. In other words, the algorithm may need to perform a calibration process before calculating the average absolute value indicator, which measures the average impact force of the container under normal shipping and handling situations. The time threshold may be set at, for example, five minutes, thereby establishing an accurate, normalized representation of an average absolute value indicator of each specific container 10. Thus, the algorithm may repeat steps 404-432 for five minutes before proceeding to step 440. If the time threshold has elapsed and the calibration is complete, the algorithm transfers to 440.

At 440, the algorithm calculates an average absolute value indicator of the mechanical shock. The average absolute value indicator (hereinafter referred to as AAVI) may be defined as the average of a plurality of absolute value indicators after the time threshold has elapsed. Furthermore, the average absolute value indicator measures the average impact force of the container under normal shipping and handling situations. To determine the average value indicator, the following formulas below may be used:

$$AAVI=ASSx+ABS(Bx)+ASSy+ABS(By)+ASSz+ABS(Bz)$$

At 444, the algorithm determines whether the absolute value indicator is below a minimum threshold. The minimum threshold may be based on, as described below in FIG. 4B, the average absolute value indicator. If so, the algorithm transfers to 456. Otherwise, the algorithm transfers to 448. At 448, the algorithm determines the absolute value indicator is above a maximum threshold. The maximum threshold may be based on, as described below in FIG. 4B, the average absolute value indicator. If so, the algorithm transfers to 452 and communicates the presence of a mechanical shock by, for example, sending a notification to via the local monitoring system 52 or the server 54. The notification may be, for example, an email, SMS/MMS message, app notification, etc., to an owner of the container 10 or the cargo located inside the container 10. Otherwise, if the absolute value is below the maximum threshold, the algorithm transfers to 456. At 456, the algorithm stores the absolute value indicator and updates the shock severity index. As an example, multiple iterations of high absolute value indicators may increase the average absolute value indicator, and thus, the shock severity index is updated accordingly. The algorithm then transfers to 460 and ends.

Figure 4B:
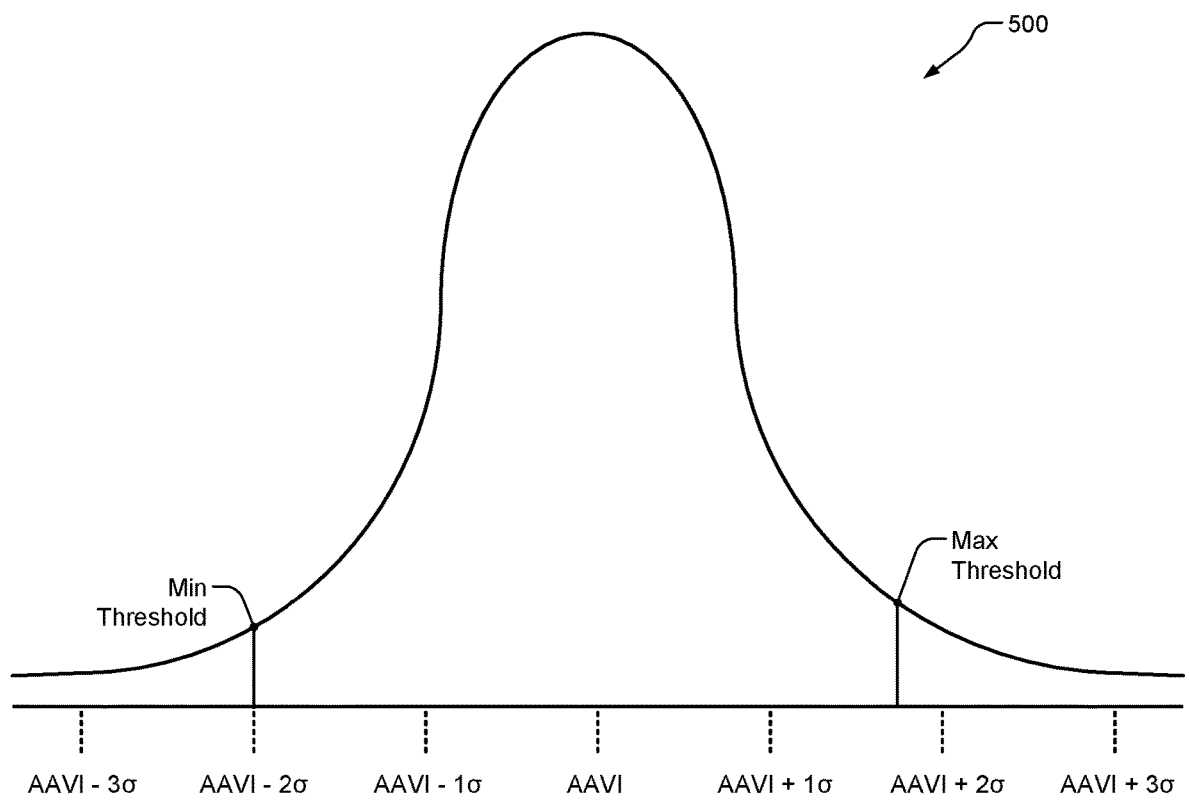
FIG. 4B is an example graph illustrating the determination of excessive mechanical shock.

With reference to FIG. 4B, an example graph illustrating the shock severity index 500 and the determination of excessive mechanical shock is shown. The shock severity index 500 is based on the principle that the average absolute value indicator measures the average impact force of the specific container 10 under normal shipping and handling situations. Each container 10 will have a different average absolute value indicator based on, for example, the material and the geometry of the container 10.

Generally, most absolute value indicators (AVI) will be close to the average absolute value indicator (AAVI) under normal shipping and handling circumstances. Thus, by using a normalized distribution for each container type, and setting the mean of the distribution as the AAVI, one may be able to establish an acceptable range of handling based on setting the minimum and maximum threshold at a certain standard deviation from the AAVI. In one embodiment, the standard deviation may be determined by the following formula:

$$\sigma = AAVI - (Min\ Threshold)/2$$

Each AVI generates a shock severity index score based on where along the distribution the AVI is located. As an example, $AAVI-3\sigma$ may be correspond with a shock severity score of 0, $AAVI-2\sigma$ may correspond with a shock severity score of 1, and $AAVI+3\sigma$ may correspond with a shock severity score of 7. Thus, the modem 20 may also be configured to provide a corresponding shock severity index score each time the AVI is above the maximum threshold.

In some embodiments, low AVIs may indicate an absence or a negligible amount of mechanical shock, and thus may not be stored or used for determining whether a shock event has occurred. As an example, based on empirical data collected during a calibration process an initial AAVI value may be, for example, 1.85. Thus, the minimum threshold value in order to be registered may be 1.2, or 2 standard deviations away from the mean, as shown in FIG. 4B.

In the case of extreme handling and/or excessive impact force, the AVI values may exceed the maximum threshold. The maximum threshold may be arbitrarily chosen. In some embodiments, the maximum threshold may be chosen based on an industry standard requirement or based on empirical data collected during a calibration process. As an example, the maximum threshold may be set to an AVI of 2.3, as determined by empirical data collected during a calibration process and as shown in FIG. 4B.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for detecting mechanical shock of a container, the method comprising:
   receiving, using a processor of a modem, a force signal from a force sensor representing an amount of impact force applied to the container;
   determining, based on instructions stored in a non-transitory memory component and executable by the processor and based on the force signal, a bias value, the bias value corresponding to an axis of gravity acting on the container;
   determining, based on instructions stored on the non-transitory memory component and executable by the processor and based on the force signal, a shock intensity of the force signal, the shock intensity corresponding to an average of a difference between the force signal and the bias value over a first predetermined sample period;
   determining, based on instructions stored on the non-transitory memory component and executable by the processor, a shock severity of the force signal in response to a determination that the shock intensity is greater than a shock intensity threshold, the shock severity corresponding to an average of an absolute value of the difference between the force signal and the bias value over a second predetermined sample period, the second predetermined sample period being longer than the first predetermined sample period;
   determining, based on instructions stored on the non-transitory memory component and executable by the processor, an average shock severity based on a plurality of shock severity values;
   determining, based on instructions stored on the non-transitory memory component and executable by the processor, an absolute value indicator based on a sum of an absolute value of the bias value and the shock severity value;
   determining, based on instructions stored on the non-transitory memory component and executable by the processor, an average absolute value indicator based on the average shock severity and the absolute value of the bias value; and
   determining, based on instructions stored on the non-transitory memory component and executable by the processor, a presence of excessive mechanical shock based on the average absolute value indicator and based on the absolute value indicator.

2. The method of claim 1 further comprising communicating, using a communication module of the modem, the presence of excessive mechanical shock to at least one of a local monitoring system and a server.

3. The method of claim 1 wherein the determination of the presence of excessive mechanical shock is based on the absolute value indicator exceeding a maximum threshold value.

4. The method of claim 1 wherein the bias value is an average value of multiple mechanical shock values.

5. The method of claim 1 wherein the shock intensity is an amount of energy measured in the first predetermined, the first predetermined sample period including ten samples.

6. The method of claim 1 wherein the shock severity is an amount of energy in the second predetermined sample period, the second predetermined sample period include four-hundred samples.

7. The method of claim 1 wherein the average shock severity is an average amount of energy measured in a predetermined number of a plurality of shock severity samples.

8. The method of claim 1 wherein the absolute value indicator is a normalized measure of energy of the mechanical shock.

9. The method of claim 1 wherein the average absolute value indicator is an average of a plurality of absolute value indicators after a time threshold has elapsed.

10. The method of claim 1 wherein the average absolute value indicator is an average impact force of the container under normal handling situations.

11. A system comprising:
a modem control unit that is configured to:
receive, using a processor of the modem control unit, a force signal from a force sensor representing an amount of impact force applied to a container;
determine, based on instructions stored in a non-transitory memory component and executable by the processor and based on the force signal, a bias value, the bias value corresponding to an axis of gravity acting on the container;
determine, based on instructions stored on the non-transitory memory component and executable by the processor and based on the force signal, a shock intensity of the force signal, the shock intensity corresponding to an average of a difference between the force signal and the bias value over a first predetermined sample period;
determine, based on instructions stored on the non-transitory memory component and executable by the processor, a shock severity of the force signal in response to a determination that the shock intensity is greater than a shock intensity threshold, the shock severity corresponding to an average of an absolute value of the difference between the force signal and the bias value over a second predetermined sample period, the second predetermined sample period being longer than the first predetermined sample period;
determine, based on instructions stored on the non-transitory memory component and executable by the processor, an average shock severity based on a plurality of shock severity values;
determine, based on instructions stored on the non-transitory memory component and executable by the processor, an absolute value indicator based on a sum of an absolute value of the bias value and the shock severity value;
determine, based on instructions stored on the non-transitory memory component and executable by the processor, an average absolute value indicator based on the average shock severity and the absolute value of the bias value; and
determine, based on instructions stored on the non-transitory memory component and executable by the processor, a presence of excessive mechanical shock based on the average absolute value indicator and based on the absolute value indicator.

12. The system of claim 11 wherein the force sensor is an accelerometer.

13. The system of claim 11 wherein the modem control unit further includes a position module that is configured to determine geospatial location data of a container.

14. The system of claim 11 wherein the modem control unit further includes a communication module that is configured to communicate operational and geospatial location data of a container to at least one of a local monitoring system and a server.

15. The system of claim 14 wherein the communication module is configured to communicate operational and geospatial location data of a container using at least one of a quad-band global system for mobile communication (quad-band GSM) module and a tri-band universal mobile telecommunications system communication (tri-band UMTS) module.

16. The system of claim 11 wherein the modem control unit is configured to receive operational data of a container from a container controller.

17. The system of claim 16 wherein the operational data includes at least one of an electric power consumption, suction, discharge temperature, pressure of a compressor, pressure of a condenser, and evaporator temperature data of the container.

18. The system of claim 11 wherein the absolute value indicator is a normalized measure of energy of the mechanical shock.

19. The system of claim 11 wherein the modem control unit further includes a plurality of LEDs that are configured to activate and deactivate based on at least one of an operating condition and a position of a container.

* * * * *